No. 639,471. Patented Dec. 19, 1899.
G. W. VAN ALSTINE.
FAUCET FILTER.
(Application filed Sept. 10, 1898.)
(No Model.)
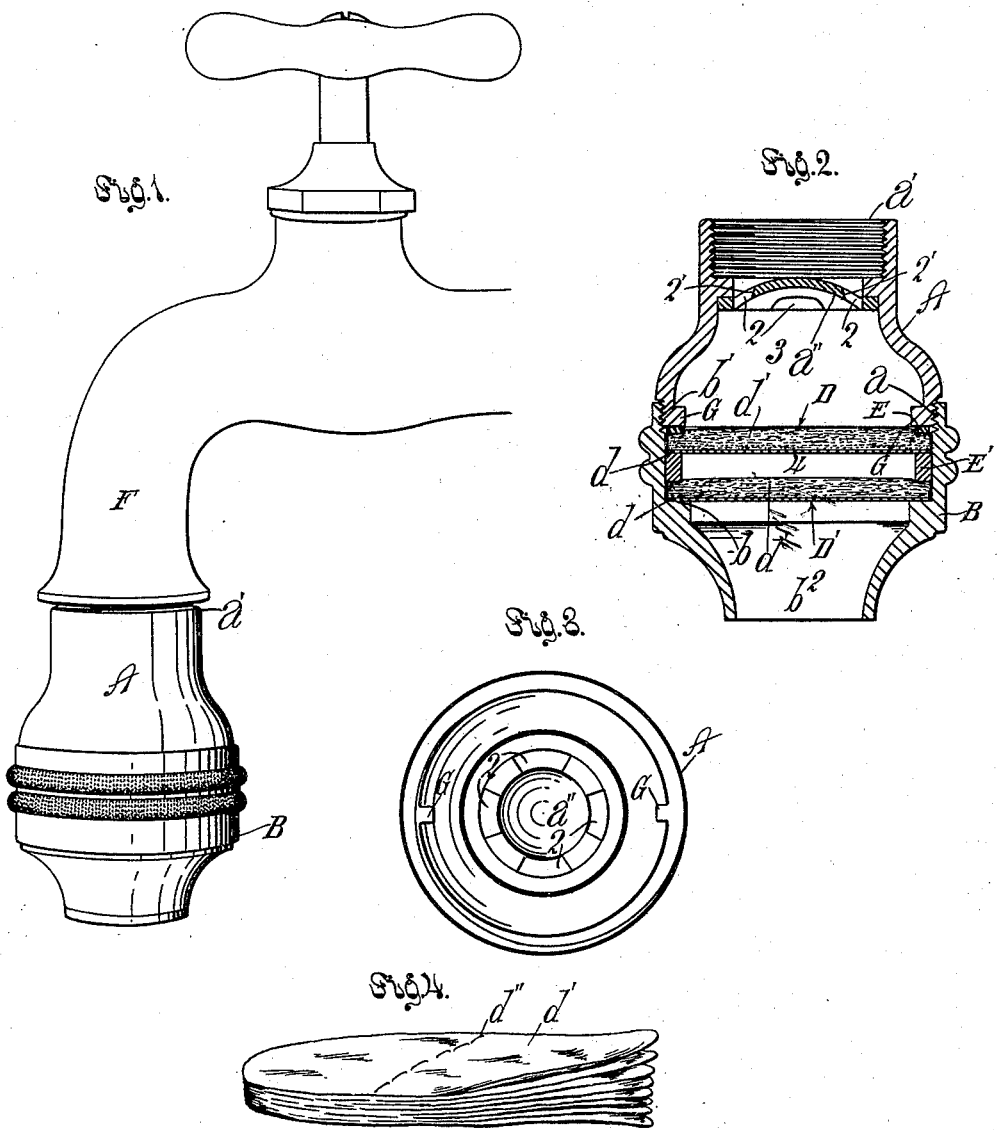

UNITED STATES PATENT OFFICE.

GEORGE WARREN VAN ALSTINE, OF LOS ANGELES, CALIFORNIA, ASSIGNOR OF ONE-HALF TO ALBERT CARL WIRTZ, OF SAME PLACE.

FAUCET-FILTER.

SPECIFICATION forming part of Letters Patent No. 639,471, dated December 19, 1899.

Application filed September 10, 1898. Serial No. 690,683. (No model.)

*To all whom it may concern:*

Be it known that I, GEORGE WARREN VAN ALSTINE, residing at Los Angeles, in the county of Los Angeles and State of California, have invented a new and useful Faucet-Filter, of which the following is a specification.

An object of my invention is to provide a convenient filter which can be kept perfectly clean with the greatest ease and the least possible expense.

In my invention I employ a disk formed of plies of porous fabric, preferably cheese-cloth, tacked together to form a unitary disk, and this is placed in the filter and is supported by a perforated gland, partition, or diaphragm. The filter-body is formed of two pieces, which are screwed together and can be readily taken apart, so that the filter-disk can be removed and thrown away with very slight labor and expense, and therefore the filter-disks can be renewed as often as desired. This is a feature of vast importance for the reason that the matter collected by a filter should be removed at least once every twenty-four hours, and by means of my invention it becomes practicable to supply the filter with new and clean filtering material once, twice, or even more times every twenty-four hours, as may be desired.

The accompanying drawings illustrate my invention.

Figure 1 is a perspective view of my newly-invented filter in position on a faucet. Fig. 2 is a vertical mid-section of the filter. Fig. 3 is a detail of the inlet member to show the wrench-seats for fixing the inlet member on the faucet. Fig. 4 is an enlarged detail of one of the filter-disks formed of plies of cheese-cloth or other suitable material tacked together by a few stitches. The edges of the cloths are turned up to show the several plies.

In the drawings, A indicates the inlet member, with one end $a$ externally screw-threaded and the other end $a'$ adapted for attachment to a faucet and provided with a diaphragm $a''$, with openings 2 around its edges to direct the water onto the walls of the chamber 3 within the body of the inlet member.

B indicates the discharge member of the faucet, with an internal annular seat $b$, and above such seat or seats the female screw $b'$, into which the inlet member A screws.

D and D' each indicate a built-up circular filter member, with its edges seated on the annular seat therefor and clamped in place by the end of the inlet member A, which is screwed into the outlet member B. By preference two filter members, with a chamber 4 between them, are used, so that the filter member D, through which the water first passes, will collect the most of the impurities, and the filter-disk $d'$ of this member will be renewed more frequently than will be necessary for the filter-disk of the member D', which will serve to intercept the impurities which pass the filter member D. Each filter member, as D or D', is composed of a perforated plate, gland, or partition $d$ and a built-up filter-disk $d'$, which is built up of a plurality of plies of porous fabric—such, for instance, as cheese-cloth or any other porous material which may be found desirable. Any number of plies which may be desired can be used for each filter-disk, and they are preferably tacked together by stitches, as at $d''$. I prefer to employ at least sixteen thicknesses of cheese-cloth in the filter, eight in each disk.

E indicates a washer between the disk $d'$ of the first filter member D and the end of the inlet member A to hold the material of the disk $d'$ in place when the member A is being screwed down thereupon.

E' indicates a ring inserted above the filter member D', which rests upon the shoulder $b$. This ring forms a seat for the upper filter member D.

E indicates a washer which rests upon the built-up filter-disk $d'$ of the filter member D. By screwing the member A into the member B and down upon the washer E such member A will clamp the washer, the filter members, and the ring firmly in place, so that the water will not displace the material of the filter-disks.

The disks are to be placed on the market in boxes or other packages to suit the trade and can be supplied at a mere nominal cost, so that they may be thrown away without material loss.

The inlet member A is made flaring from the diaphragm $a''$ toward the filter-seat, so as to provide a considerable cross-sectional area for the filter, thus to avoid clogging the filtering material.

G indicates the wrench-seat lugs inside the lower end of the inlet member. In practice it is desirable to screw the inlet member quite tightly upon the faucet, so that it will not be readily removed therefrom. By inserting a wrench into the wrench-seat G the inlet member can be forcibly turned to screw it upon the faucet.

In practice my filter is attached to the hose-bib or faucet F, and when it is desired to draw filtered water the faucet is turned for this purpose and the water passes from the faucet into the filter member A and the stream is intercepted by the diaphragm $a''$, which breaks the force of the stream and directs the water outward against the walls of the chamber 3. The margins of the holes 2 around the edges of the diaphragm are preferably chamfered, as shown at $2'$ in Fig. 2, to facilitate this action, and the diaphragm is preferably arched, as at $a''$, for the same purpose. The water passing down the walls comes into contact with the edges of the filter member D and, filling the chamber 3, passes through the filter member D, which collects the principal portion of the impurities. The water then flows through the chamber 4 and through the filter member D' and thence out at $b^2$.

At stated intervals, to clean the filter, the attendant will unscrew the outlet member B, upturn the same, and tap it slightly on any suitable body or support, thus causing the first filter member D to fall out. Then the filter member D' can be inspected and if it does not require renewing the upper perforated sheet $d$ will be replaced and a new filter-disk $d'$ be placed thereupon. The washer E will then be replaced, and the member B will then be screwed in place on the outlet member.

In case the disks of both filter members D and D' require to be renewed the attendant will remove both of the filters and replace with new disks.

Now, having described my invention, what I claim as new, and desire to secure by Letters Patent, is—

1. As a new article of manufacture a filter-disk formed of plies of porous fabric tacked together substantially as set forth.

2. The combination of the inlet member adapted at one end for attachment to a faucet and screw-threaded at the other end and provided between its ends with a diaphragm with holes around the edges of the diaphragm; an outlet member with internal annular shoulder, and screw-threaded to fit the inlet member; a perforated diaphragm resting upon the annular shoulder; a filter-disk, composed of plies of porous fabric and resting upon the perforated diaphragm; a ring resting upon the fabric; a perforated disk resting upon the ring; a disk of plies of porous fabric resting upon such perforated disk; the inlet member being screwed into the outlet member to clamp the disks and ring in place.

3. The combination of the inlet member with diaphragm: the outlet member with annular seat: a perforated sheet on said seat: a filter-disk on said sheet: a ring on the filter-disk: a perforated sheet on the ring: and a filter-disk on such sheet: the inlet and outlet members being separably secured together: substantially as set forth.

GEORGE WARREN VAN ALSTINE.

Witnesses:
 JAMES R. TOWNSEND,
 ALFRED I. TOWNSEND,